(12) United States Patent
Park et al.

(10) Patent No.: US 8,647,227 B2
(45) Date of Patent: Feb. 11, 2014

(54) PLANETARY GEAR TRAIN OF AUTOMATIC TRANSMISSION FOR VEHICLES

(75) Inventors: Jongsool Park, Hwaseong-si (KR); Tae Seok Seo, Suwon-si (KR); Hyukjun Lee, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/588,376

(22) Filed: Aug. 17, 2012

(65) Prior Publication Data

US 2013/0150204 A1   Jun. 13, 2013

(30) Foreign Application Priority Data

Dec. 8, 2011   (KR) .................... 10-2011-0130883

(51) Int. Cl.
   *F16H 3/62*   (2006.01)
(52) U.S. Cl.
   USPC .......................................................... 475/275
(58) Field of Classification Search
   None
   See application file for complete search history.

(56) References Cited

U.S. PATENT DOCUMENTS

| | | | | |
|---|---|---|---|---|
| 7,226,381 B2 * | 6/2007 | Klemen | | 475/275 |
| 7,402,119 B2 * | 7/2008 | Kamada et al. | | 475/282 |
| 7,637,837 B2 * | 12/2009 | Hart et al. | | 475/269 |
| 7,798,932 B2 * | 9/2010 | Wittkopp et al. | | 475/269 |
| 7,833,124 B2 * | 11/2010 | Choi | | 475/286 |
| 7,887,453 B2 * | 2/2011 | Phillips et al. | | 475/275 |
| 7,905,809 B2 * | 3/2011 | Wittkopp et al. | | 475/269 |
| 8,047,949 B2 * | 11/2011 | Hart et al. | | 475/275 |
| 8,231,496 B2 * | 7/2012 | Gumpoltsberger et al. | .. | 475/275 |
| 8,246,504 B2 * | 8/2012 | Gumpoltsberger et al. | .. | 475/286 |
| 2011/0045942 A1 | 2/2011 | Gumpoltsberger et al. | | |
| 2012/0329600 A1 * | 12/2012 | Park et al. | | 475/276 |
| 2013/0029799 A1 * | 1/2013 | Park et al. | | 475/276 |
| 2013/0150203 A1 * | 6/2013 | Park et al. | | 475/276 |

FOREIGN PATENT DOCUMENTS

| | | |
|---|---|---|
| JP | 2006-349153 A | 12/2006 |
| KR | 10-2008-0033789 A | 4/2008 |
| KR | 10-0963712 B1 | 6/2010 |

* cited by examiner

*Primary Examiner* — Dirk Wright
(74) *Attorney, Agent, or Firm* — Morgan, Lewis & Bockius LLP (57) ABSTRACT

A planetary gear train of an automatic transmission includes an input shaft, an output shaft, a first planetary gear set outputting a negative rotation speed by using a rotation speed input from the input shaft, a second planetary gear set converting the negative rotation speed into a positive rotation speed, a compound planetary gear set changing the rotation speed selectively input from the input shaft, the negative rotation speed and the positive rotation speed into nine forward speeds and one reverse speed, eight rotational members, and six friction members, and brakes interposed between a selected rotational member among the rotational members and a transmission housing.

7 Claims, 4 Drawing Sheets

|  | clutch | | | | brake | | gear ratio | step ratio |
|---|---|---|---|---|---|---|---|---|
|  | C1 | C2 | C3 | C4 | B1 | B2 |  |  |
| D1 |  |  | ● |  | ● |  | 4.68 | D1/D9=7.54 |
| D2 | ● |  |  |  | ● |  | 3.02 | D1/D2=1.55 |
| D3 | ● |  | ● |  |  |  | 2.30 | D2/D3=1.32 |
| D4 | ● |  |  |  |  | ● | 1.60 | D3/D4=1.44 |
| D5 | ● |  |  | ● |  |  | 1.21 | D4/D5=1.32 |
| D6 | ● | ● |  |  |  |  | 1.00 | D5/D6=1.21 |
| D7 |  | ● |  | ● |  |  | 0.84 | D6/D7=1.20 |
| D8 |  | ● |  |  |  | ● | 0.70 | D7/D8=1.19 |
| D9 |  | ● | ● |  |  |  | 0.61 | D8/D9=1.15 |
| REV |  |  |  | ● | ● |  | -4.45 | R/D1=0.95 |

FIG. 4

PLANETARY GEAR TRAIN OF AUTOMATIC TRANSMISSION FOR VEHICLES

CROSS-REFERENCE TO RELATED APPLICATION

The present application claims priority of Korean Patent Application Number 10-2011-0130883 filed Dec. 8, 2011, the entire contents of which application is incorporated herein for all purposes by this reference.

BACKGROUND OF INVENTION

1. Field of Invention

The present invention relates to an automatic transmission for vehicles. More particularly, the present invention relates to a planetary gear train of an automatic transmission for vehicles which improves power delivery performance and reduces fuel consumption.

2. Description of Related Art

Typically, a planetary gear train is realized by combining a plurality of planetary gear sets, and the planetary gear train including the plurality of planetary gear sets receives torque from a torque converter and changes and transmits the torque to an output shaft.

It is well known that when a transmission realizes a greater number of shift speeds, speed ratios of the transmission can be more optimally designed, and therefore a vehicle can have economical fuel mileage and better performance. For that reason, the planetary gear train that is able to realize more shift speeds is under continuous investigation.

Though achieving the same number of speeds, the planetary gear train has a different operating mechanism according to a connection between rotation elements (i.e., sun gear, planet carrier, and ring gear).

In addition, the planetary gear train has different features such a durability, power delivery efficiency, and size depend on the layout thereof. Therefore, designs for a combining structure of a gear train are also under continuous investigation.

In addition, the planetary gear train realizes a plurality of shift-speeds. However, another friction member must be operated after one friction member is released so as to shift to a neighboring shift-speed from a view of shift control.

In addition, a step ratio between the neighboring shift-speeds should be controlled to be suitable according to the planetary gear train.

Currently, four-speed and five-speed automatic transmissions are most often found on the market. However, six-speed automatic transmissions have also been realized for enhancement of performance of power transmission and for enhanced fuel mileage of a vehicle. In addition, eight-speed automatic transmissions and tenth-speed automatic transmissions have been developed at a good pace.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a planetary gear train of an automatic transmission for vehicles having advantages of achieving nine forward speeds and a reverse speed with improved controllability of friction members, suitable step ratios, and improved performance and fuel economy by combining a plurality of planetary gear sets with a plurality of friction members.

Various aspects of the present invention provide for a planetary gear train of an automatic transmission for vehicles that may include an input shaft adapted to receive engine torque, an output shaft adapted to output a shifted torque, a first planetary gear set adapted to always output a negative rotation speed by using a rotation speed input from the input shaft, a second planetary gear set adapted to convert the negative rotation speed input from the first planetary gear set into a positive rotation speed and to output the positive rotation speed, a compound planetary gear set formed by combining third and fourth planetary gear sets, and adapted to change the rotation speed selectively input from the input shaft through two paths and the negative rotation speed and the positive rotation speed input respectively from the first and second planetary gear sets into nine forward speeds and one reverse speed and to output the nine forward speeds and the one reverse speed, eight rotational members consisting of two rotation elements connected to each other or one rotation element among the rotation elements of the first and second planetary gear sets and the compound planetary gear set, and six friction members consisting of clutches interposed between a selected rotational member among the rotational members and the input shaft or between selected rotational members, and brakes interposed between a selected rotational member among the rotational members and a transmission housing.

According to one aspect of the present invention, a planetary gear train of an automatic transmission for vehicles achieving multiple shift-speeds including an input shaft adapted to receive engine torque, an output shaft adapted to output a shifted torque, a first planetary gear set being a single pinion planetary gear set having a first sun gear, a first planet carrier, and a first ring gear, a second planetary gear set being a double pinion planetary gear set having a second sun gear, a second planet carrier, and a second ring gear, a compound planetary gear set formed by combining a third planetary gear set having a third sun gear, a third planet carrier, and a third ring gear, and a fourth planetary gear set having a fourth sun gear, a fourth planet carrier, and a fourth ring gear, a first rotational member consisting of the first sun gear and adapted to be directly connected to the input shaft so as to be always operated as an input element, a second rotational member consisting of the first planet carrier and the second ring gear and adapted to be directly connected to a transmission housing so as to be always operated as a fixed element, a third rotational member consisting of the first ring gear and adapted to be always operated as an output element, a fourth rotational member consisting of the second planet carrier and adapted to be selectively connected to the third rotational member so as to be operated as a selective input element, a fifth rotational member consisting of the second sun gear, the third sun gear, and the fourth sun gear, and adapted to be selectively connected to the third rotational member so as to be operated as a selective input element or to be selectively connected to the transmission housing so as to be operated as a selective fixed element, a sixth rotational member consisting of the third planet carrier and adapted to be selectively connected to the transmission housing so as to be operated as a selective fixed element or to be selectively connected to the input shaft so as to be operated as a selective input element, a seventh rotational member consisting of the third ring gear and the fourth planet carrier and adapted to be directly connected to the output shaft so as to be operated as a final output element, an eighth rotation element consisting of the fourth ring gear and adapted to be selectively connected to the input shaft so as to be operated as a selective input element, and six friction members consisting of clutches interposed between a selected rotational member among the rotational members and the input shaft or between selected rotational members, and brakes interposed between a selected rotational member among the rotational members and a transmission housing is disclosed.

The six friction members may include a first clutch interposed between the input shaft and the eighth rotational member, a second clutch interposed between the input shaft and the sixth rotational member, a third clutch interposed between the third rotational member and the fifth rotational member, a fourth clutch interposed between the third rotational member and the fourth rotational member, a first brake interposed between the sixth rotational member and the transmission housing, and a second brake interposed between the third rotational member and the transmission housing.

The multiple shift-speeds may include a first forward speed achieved by operating the third clutch and the first brake, a second forward speed achieved by operating the first clutch and the first brake, a third forward speed achieved by operating the first clutch and the third clutch, a fourth forward speed achieved by operating the first clutch and the second brake, a fifth forward speed achieved by operating the first clutch and the fourth clutch, a sixth forward speed achieved by operating the first clutch and the second clutch, a seventh forward speed achieved by operating the second clutch and the fourth clutch, an eighth forward speed achieved by operating the second clutch and the second brake, a ninth forward speed achieved by operating the second clutch and the third clutch, and a reverse speed achieved by operating the fourth clutch and the first brake.

Various aspects of the present invention provide for a planetary gear train of an automatic transmission for vehicles achieving multiple shift-speeds including an input shaft adapted to receive engine torque, an output shaft adapted to output a shifted torque, a first planetary gear set being a single pinion planetary gear set having a first sun gear, a first planet carrier, and a first ring gear, a second planetary gear set being a double pinion planetary gear set having a second sun gear, a second planet carrier, and a second ring gear, a compound planetary gear set formed by combining a third planetary gear set having a third sun gear, a third planet carrier, and a third ring gear, and a fourth planetary gear set having a fourth sun gear, a fourth planet carrier, and a fourth ring gear, a first rotational member consisting of the first sun gear and adapted to be directly connected to the input shaft so as to be always operated as an input element, a second rotational member consisting of the first planet carrier and the second planet carrier and adapted to be directly connected to a transmission housing so as to be always operated as a fixed element, a third rotational member consisting of the first ring gear and adapted to be always operated as an output element, a fourth rotational member consisting of the second ring gear and adapted to be selectively connected to the third rotational member so as to be operated as a selective input element, a fifth rotational member consisting of the second sun gear, the third sun gear, and the fourth sun gear, and adapted to be selectively connected to the third rotational member so as to be operated as a selective input element or to be selectively connected to the transmission housing so as to be operated as a selective fixed element, a sixth rotational member consisting of the third planet carrier and adapted to be selectively connected to the transmission housing so as to be operated as a selective fixed element or to be selectively connected to the input shaft so as to be operated as a selective input element, a seventh rotational member consisting of the third ring gear and the fourth planet carrier and adapted to be directly connected to the output shaft so as to be operated as a final output element, an eighth rotation element consisting of the fourth ring gear and adapted to be selectively connected to the input shaft so as to be operated as a selective input element, and six friction members consisting of clutches interposed between a selected rotational member among the rotational members and the input shaft or between selected rotational members, and brakes interposed between a selected rotational member among the rotational members and a transmission housing is disclosed.

The six friction members may include a first clutch interposed between the input shaft and the eighth rotational member, a second clutch interposed between the input shaft and the sixth rotational member, a third clutch interposed between the third rotational member and the fifth rotational member, a fourth clutch interposed between the third rotational member and the fourth rotational member, a first brake interposed between the sixth rotational member and the transmission housing, and a second brake interposed between the third rotational member and the transmission housing.

The multiple shift-speeds may include a first forward speed achieved by operating the third clutch and the first brake, a second forward speed achieved by operating the first clutch and the first brake, a third forward speed achieved by operating the first clutch and the third clutch, a fourth forward speed achieved by operating the first clutch and the second brake, a fifth forward speed achieved by operating the first clutch and the fourth clutch, a sixth forward speed achieved by operating the first clutch and the second clutch, a seventh forward speed achieved by operating the second clutch and the fourth clutch, an eighth forward speed achieved by operating the second clutch and the second brake, a ninth forward speed achieved by operating the second clutch and the third clutch, and a reverse speed achieved by operating the fourth clutch and the first brake.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Description of components that are not necessary for explaining the various embodiments will be omitted, and the same constituent elements are denoted by the same reference numerals in this specification.

In the detailed description, ordinal numbers are used for distinguishing constituent elements having the same terms, and have no specific meanings.

Figure 1:
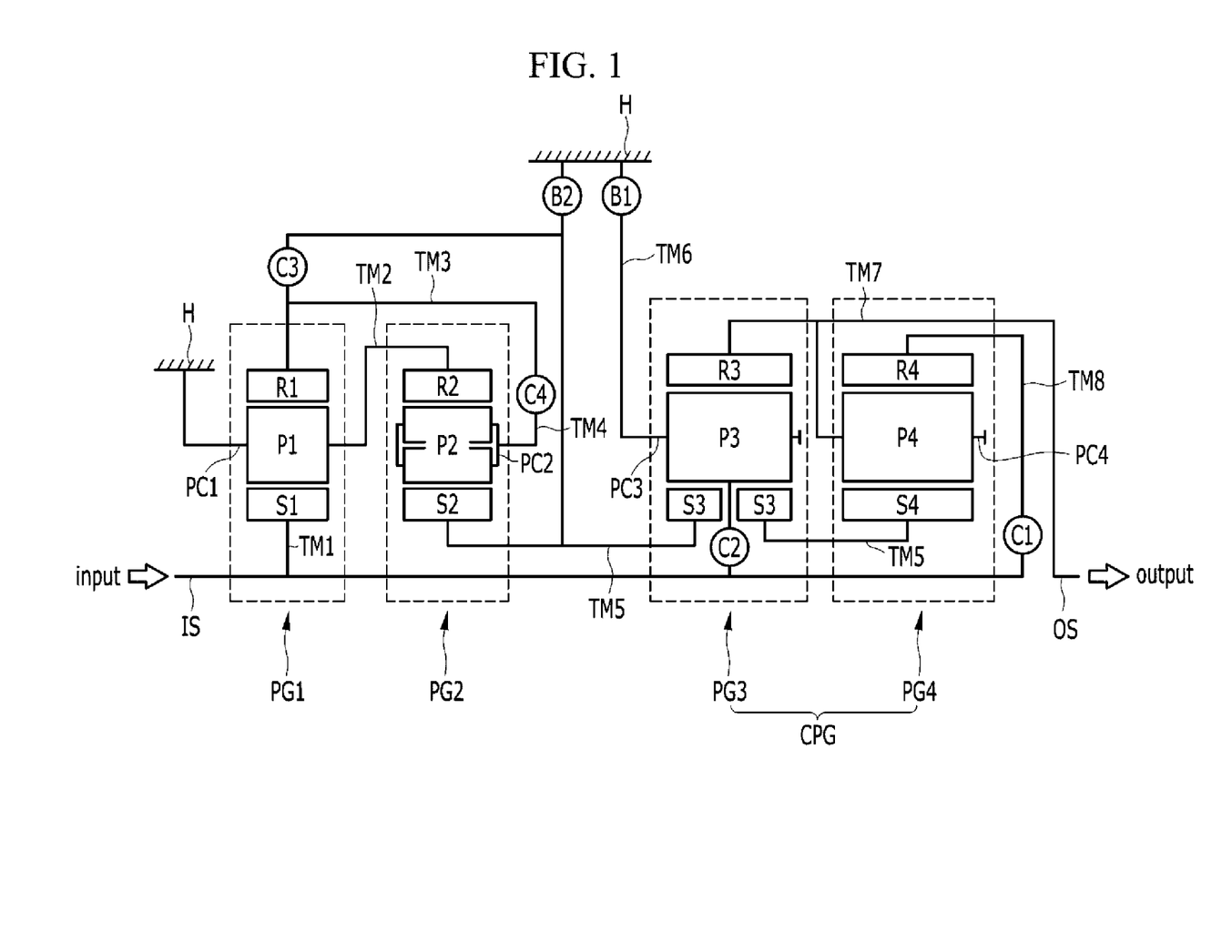
FIG. 1 is a schematic diagram of an exemplary planetary gear train according to the present invention.
Figure 2:
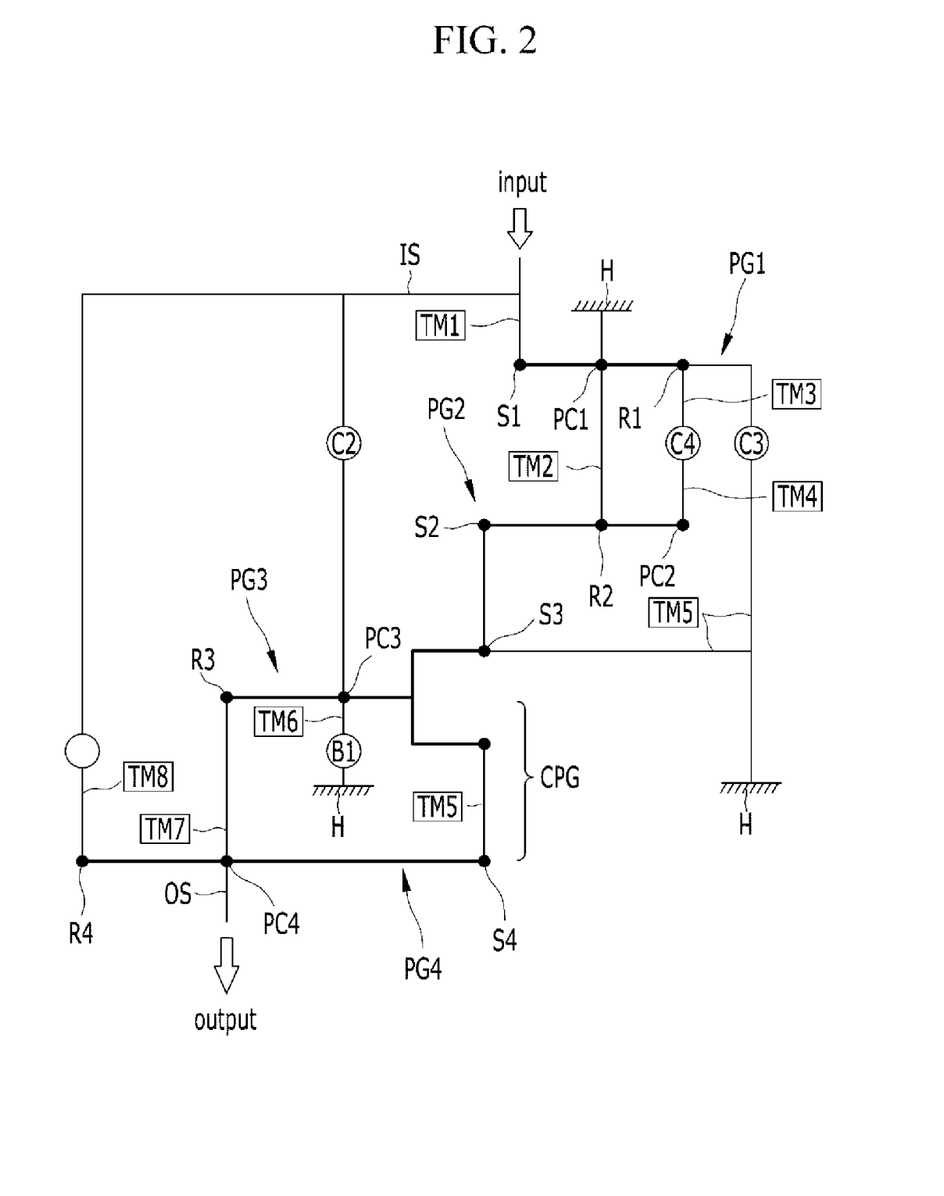
FIG. 2 is a diagram showing connections of the planetary gear train of FIG. 1.

FIG. 1 is a schematic diagram of a planetary gear train according to various embodiments of the present invention, and FIG. 2 is a diagram showing connections of a planetary gear train according to various embodiments of the present invention.

Referring to FIG. 1 and FIG. 2, a planetary gear train according to various embodiments of the present invention includes first, second, third, and fourth planetary gear sets PG1, PG2, PG3, and PG4 disposed on the same axis, an input shaft IS, an output shaft OS, eight rotational members TM1, TM2, TM3, TM4, TM5, TM6, TM7, TM8 directly or selectively connecting rotation elements of the first, second, third, and fourth planetary gear sets PG1, PG2, PG3, and PG4, six friction members C1, C2, C3, C4, B1, and B2, and a transmission housing H.

The first and second planetary gear sets PG1 and PG2 are operated independently. Two rotation elements of the third planetary gear sets PG3 are fixedly connected to two rotation elements of the fourth planetary gear sets PG4 such that the third and fourth planetary gear sets PG3 and PG4 are operated as one compound planetary gear set CPG.

A rotation speed input from the input shaft IS is changed by the first and second planetary gear sets PG1 and PG2 and the compound planetary gear set CPG and is output through the output shaft OS.

In addition, the planetary gear sets are disposed in a sequence of the first and second planetary gear sets PG1 and PG2 and the compound planetary gear set CPG from an engine to the rear.

The input shaft IS is an input member, and torque from a crankshaft of the engine is changed through a torque converter and is input to the input shaft IS.

The output shaft OS is an output member and delivers driving torque so as to run driving wheels through a differential apparatus.

The first planetary gear set PG1 is a single pinion planetary gear set, and includes a first sun gear S1, a first ring gear R1, and a first planet carrier PC1 rotatably supporting a first pinion P1 engaged with the first sun gear S1 and the first ring gear R1.

The second planetary gear set PG2 is a double pinion planetary gear set, and includes a second sun gear S2, a second ring gear R2, and a second planet carrier PC2 rotatably supporting a pair of second pinions P2 engaged with the second sun gear S2 and the second ring gear R2.

The third planetary gear set PG3 is a single pinion planetary gear set, and includes a third sun gear S3, a third ring gear R3, and a third planet carrier PC3 rotatably supporting a third pinion P3 engaged with the third sun gear S3 and the third ring gear R3.

The fourth planetary gear set PG4 is a single pinion planetary gear set, and includes a fourth sun gear S4, a fourth ring gear R4, and a fourth planet carrier PC4 rotatably supporting a fourth pinion P4 engaged with the fourth sun gear S4 and the fourth ring gear R4.

At least one of rotation elements of the first, second, third, and fourth planetary gear sets PG1, PG2, PG3, and PG4 is directly connected to each other.

In further detail, the first planet carrier PC1 is connected to the second ring gear R2, the second sun gear S2 is connected to the third sun gear S3, the third sun gear S3 is connected to the fourth sun gear S4, and the third ring gear R3 is connected to the fourth planet carrier PC4.

Accordingly, the planetary gear train according to various embodiments may include eight rotational members TM1-TM8.

The first rotational member TM1 consists of the first sun gear S1, and is adapted to be connected to the input shaft IS and be always operated as an input element.

The second rotational member TM2 consists of the first planet carrier PC1 and the second ring gear R2, and is directly connected to the transmission housing H so as to be always operated as a fixed element.

The third rotational member TM3 consists of the first ring gear R1 and is always operated as an output element.

The fourth rotational member TM4 consists of the second planet carrier PC2 and is selectively connected to the third rotational member TM3 so as to be operated as a selective input element.

The fifth rotational member TM5 consists of the second sun gear S2, the third sun gear S3, and the fourth sun gear S4, and is selectively connected to the third rotational member TM3 so as to be operated as a selective input element or is selectively connected to the transmission housing H so as to be operated as a selective fixed element.

The sixth rotational member TM6 consists of the third planet carrier PC3, and is selectively connected to the transmission housing H so as to be operated as a selective fixed element or is selectively connected to the input shaft IS so as to be operated as a selective input element.

The seventh rotational member TM7 consists of the third ring gear R3 and the fourth planet carrier PC4, and is directly connected to the output shaft OS so as to be operated as a final output element.

The eighth rotation element TM8 consists of the fourth ring gear R4 and is selectively connected to the input shaft IS so as to be operated as a selective input element.

In addition, rotational members operated as selective input elements among the rotational members TM1-TM8 are selectively connected to the input shaft IS through clutches C1 and C2, and the rotational members among the rotational members TM1-TM8 are connected to each other through clutches C3 and C4.

In addition, the rotational members operated as the selective fixed elements among the rotational members TM1-TM8 are connected to the transmission housing H through brakes B1 and B2.

A first clutch C1 is interposed between the input shaft IS and the eighth rotational member TM8 so as to operate the eighth rotational member TM8 as the selective input element.

A second clutch C2 is interposed between the input shaft IS and the sixth rotational member TM6 so as to operate the sixth rotational member TM6 as the selective input element.

A third clutch C3 is interposed between the third rotational member TM3 and the fifth rotational member TM5 so as to deliver an output of the third rotational member TM3 to the fifth rotational member TM5.

A fourth clutch C4 is interposed between the third rotational member TM3 and the fourth rotational member TM4 so as to cause the first and second planetary gear sets PG1 and PG2 to become direct-coupling states.

A first brake B1 is interposed between the sixth rotational member TM6 and the transmission housing H so as to operate the sixth rotational member TM6 as the selective fixed element.

A second brake B2 is interposed between the fifth rotational member TM5 and the transmission housing H so as to operate the fifth rotational member TM5 as the selective fixed element.

Friction members consisting of the first, second, third, and fourth clutches C1, C2, C3, and C4 and the first and second brakes B1 and B2 are conventional multi-plate friction elements of wet type that are operated by hydraulic pressure.

Figure 3:
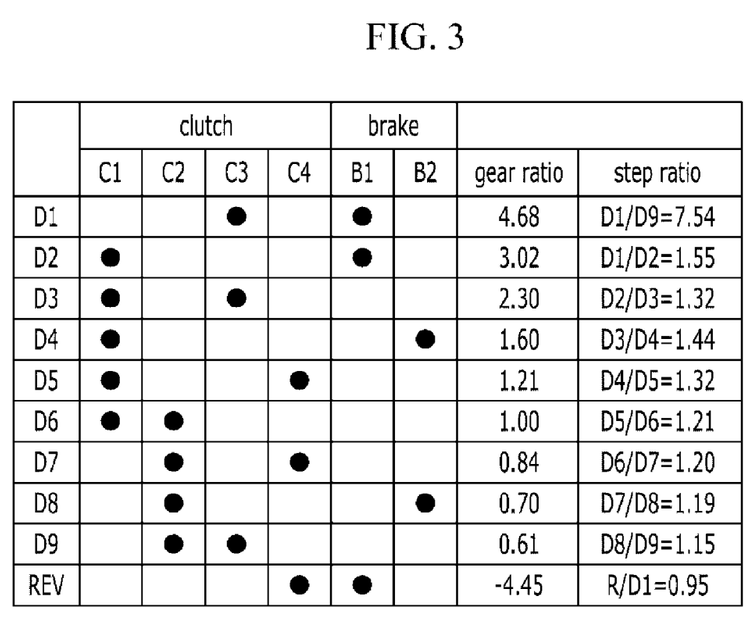
FIG. 3 is an operational chart of friction members at each shift-speed applied to the planetary gear train of FIG. 1.

FIG. 3 is an operational chart of friction members at each shift-speed applied to a planetary gear train according to various embodiments of the present invention.

As shown in FIG. 3, two friction members are operated at each shift-speed to according various embodiments of the present invention.

A first forward speed D1 is achieved by operating the third clutch C3 and the first brake B1.

A second forward speed D2 is achieved by operating the first clutch C1 and the first brake B1.

A third forward speed D3 is achieved by operating the first clutch C1 and the third clutch C3.

A fourth forward speed D4 is achieved by operating the first clutch C1 and the second brake B2.

A fifth forward speed D5 is achieved by operating the first clutch C1 and the fourth clutch C4.

A sixth forward speed D6 is achieved by operating the first clutch C1 and the second clutch C2.

A seventh forward speed D7 is achieved by operating the second clutch C2 and the fourth clutch C4.

An eighth forward speed D8 is achieved by operating the second clutch C2 and the second brake B2.

A ninth forward speed D9 is achieved by operating the second clutch C2 and the third clutch C3.

A reverse speed REV is achieved by operating the fourth clutch C4 and the first brake B1.

In a state that the rotation speed of the input shaft IS is input to the first rotational member TM1, the second rotational member TM2 is operated as the fixed element in the first planetary gear set PG1. Therefore, the first planetary gear set PG1 always outputs a negative rotation speed through the third rotational member TM3.

In a state that the negative rotation speed of the third rotational member TM3 is input to the fourth rotational member TM4 by operation of the fourth clutch C4 at the fifth and seventh forward speeds and the reverse speed, the second rotational member TM2 is operated as the fixed element in the second planetary gear set PG2. Therefore, the second planetary gear set PG2 outputs a positive rotation speed through the fifth rotation element TM5 at the fifth and seventh forward speeds and the reverse speed.

The compound planetary gear set CPG converts rotation speeds input through the fifth rotational member TM5, the sixth rotational member TM6, and the eighth rotational member TM8 and outputs the nine forward speeds and one reverse speed through the seventh rotational member TM7.

Shifting processes due to selective operation of the friction members are well known to a person skilled in the automatic transmission art. Therefore, detailed description will be omitted.

The planetary gear train according to various embodiments of the present invention combines four planetary gear sets with the six friction members such that the nine forward speeds and one reverse speed can be achieved by operating the selected two friction members at each shift-speed.

Since six friction members are used, a hydraulic control system controlling the friction members can be simplified, and cost and weight may be reduced. In addition, it is easy for the planetary gear train to be mounted.

A sequential shifting is performed by releasing one friction member and operating another friction member. Therefore, shift control may be facilitated.

In addition, speed ratio characteristic and a step ratio between neighboring shift-speeds at low gear ratio/high gear ratio demanded by vehicle power performance is almost uniform as shown in FIG. 3.

Figure 4:
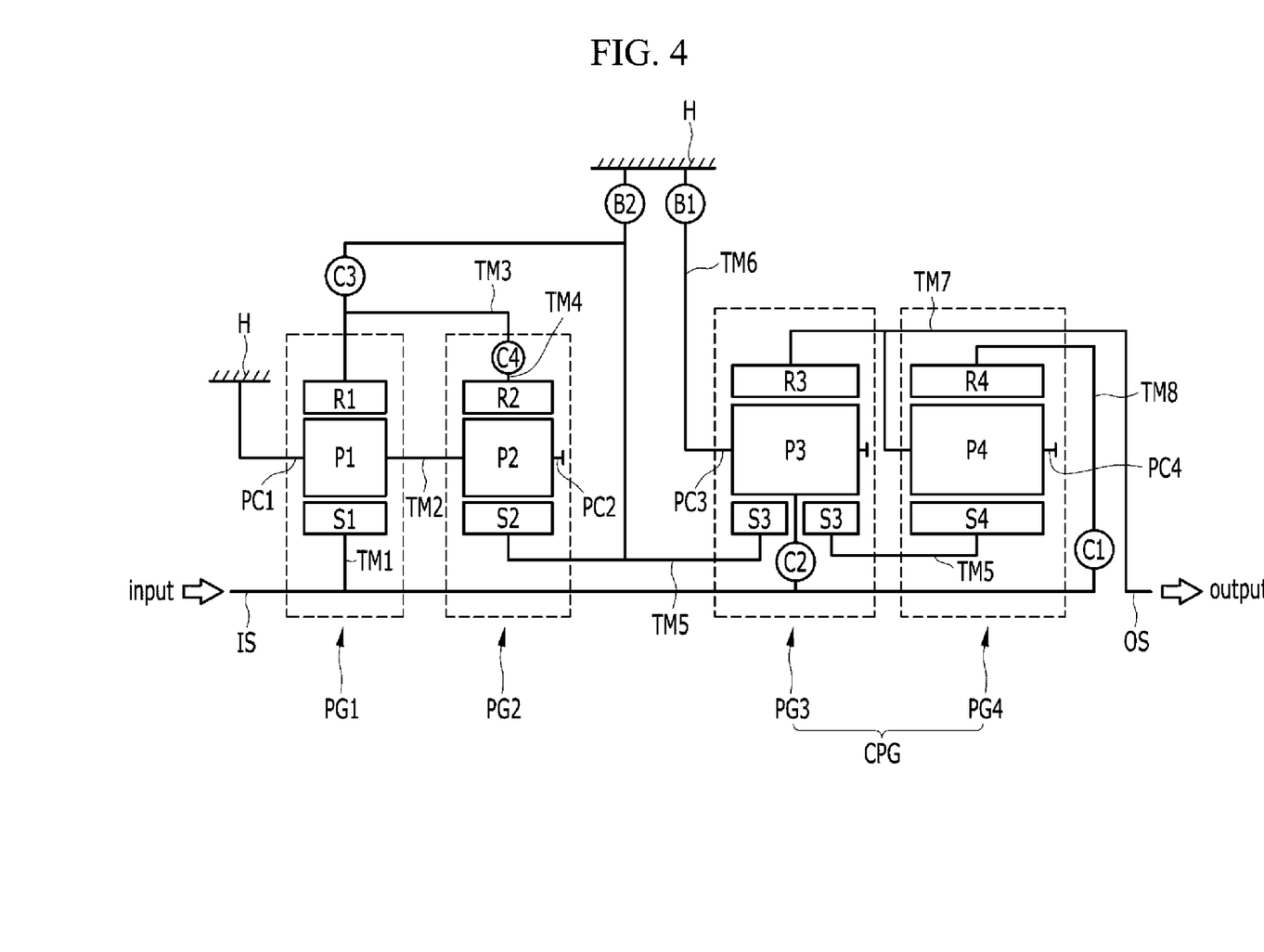
FIG. 4 is a schematic diagram of an exemplary planetary gear train according to the present invention.

FIG. 4 is a schematic diagram of a planetary gear train according to various embodiments of the present invention.

Referring to FIG. 4, the second planetary gear set PG2 is a double pinion planetary gear set similar to that described above, but the second planetary gear set PG2 is a single pinion planetary gear set according to various embodiments.

In addition, the first planet carrier PC1 is directly connected to the second planet carrier PC2, and the first ring gear R1 is selectively connected to the second ring gear R2.

Therefore, the planetary gear train according to various embodiments of the present invention includes eight rotational members TM1-TM8.

The first rotational member TM1 consists of the first sun gear S1, and is adapted to be connected to the input shaft IS and be always operated as an input element.

The second rotational member TM2 consists of the first planet carrier PC1 and the second planet carrier PC2, and is directly connected to the transmission housing H so as to be always operated as a fixed element.

The third rotational member TM3 consists of the first ring gear R1 and is always operated as an output element.

The fourth rotational member TM4 consists of the second ring gear R2 and is selectively connected to the third rotational member TM3 so as to be operated as a selective input element.

The fifth rotational member TM5 consists of the second sun gear S2, the third sun gear S3, and the fourth sun gear S4, and is selectively connected to the third rotational member TM3 so as to be operated as a selective input element or is selectively connected to the transmission housing H so as to be operated as a selective fixed element.

The sixth rotational member TM6 consists of the third planet carrier PC3, and is selectively connected to the transmission housing H so as to be operated as a selective fixed element or is selectively connected to the input shaft IS so as to be operated as a selective input element.

The seventh rotational member TM7 consists of the third ring gear R3 and the fourth planet carrier PC4, and is directly connected to the output shaft OS so as to be operated as a final output element.

The eighth rotation element TM8 consists of the fourth ring gear R4 and is selectively connected to the input shaft IS so as to be operated as a selective input element.

Various embodiments of the present invention may differ from those described above in the rotation elements included in the second rotational member TM2 and the fourth rotational member TM4, but arrangement and operation of the friction members C1-C4 and B1-B2 may be the same as those described above. Therefore, detailed description will be omitted.

The planetary gear train according to various embodiments of the present invention combines four planetary gear sets with the six friction members such that the nine forward speeds and one reverse speed can be achieved by operating the selected two friction members at each shift-speed.

Since six friction members are used, a hydraulic control system controlling the friction members can be simplified, and cost and weight may be reduced. In addition, it is easy for the planetary gear train to be mounted.

A sequential shifting is performed by releasing one friction member and operating another friction member. Therefore, shift control may be facilitated.

In addition, speed ratio characteristic and a step ratio between neighboring shift-speeds at low gear ratio/high gear ratio demanded by vehicle power performance is almost uniform as shown in FIG. 3.

For convenience in explanation and accurate definition in the appended claims, the terms rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for vehicles, comprising:
    an input shaft adapted to receive engine torque;
    an output shaft adapted to output a shifted torque;
    a first planetary gear set adapted to always output a negative rotation speed by using a rotation speed input from the input shaft;
    a second planetary gear set adapted to convert the negative rotation speed input from the first planetary gear set into a positive rotation speed and to output the positive rotation speed;
    a compound planetary gear set formed by combining third and fourth planetary gear sets, and adapted to change the rotation speed selectively input from the input shaft through two paths and the negative rotation speed and the positive rotation speed input, respectively, from the first and second planetary gear sets into nine forward speeds and one reverse speed, and to output the nine forward speeds and the one reverse speed;
    eight rotational members including two rotation elements connected to each other or one rotation element among rotation elements of the first and second planetary gear sets and the compound planetary gear set; and
    six friction members including clutches interposed between a selected rotational member among the rotational members and the input shaft or between selected rotational members, and brakes interposed between a selected rotational member among the rotational members and a transmission housing.

2. A planetary gear train of an automatic transmission for vehicles achieving multiple shift-speeds, the planetary gear train comprising:
    an input shaft adapted to receive engine torque;
    an output shaft adapted to output a shifted torque;
    a first planetary gear set being a single pinion planetary gear set having a first sun gear, a first planet carrier, and a first ring gear;
    a second planetary gear set being a double pinion planetary gear set having a second sun gear, a second planet carrier, and a second ring gear;
    a compound planetary gear set formed by combining a third planetary gear set having a third sun gear, a third planet carrier, and a third ring gear, and a fourth planetary gear set having a fourth sun gear, a fourth planet carrier, and a fourth ring gear;
    a first rotational member consisting of the first sun gear and adapted to be directly connected to the input shaft so as to be always operated as an input element;
    a second rotational member consisting of the first planet carrier and the second ring gear and adapted to be directly connected to a transmission housing so as to be always operated as a fixed element;
    a third rotational member consisting of the first ring gear and adapted to be always operated as an output element;
    a fourth rotational member consisting of the second planet carrier and adapted to be selectively connected to the third rotational member so as to be operated as a selective input element;
    a fifth rotational member consisting of the second sun gear, the third sun gear, and the fourth sun gear, and adapted to be selectively connected to the third rotational member so as to be operated as a selective input element or to be selectively connected to the transmission housing so as to be operated as a selective fixed element;
    a sixth rotational member consisting of the third planet carrier and adapted to be selectively connected to the transmission housing so as to be operated as a selective fixed element or to be selectively connected to the input shaft so as to be operated as a selective input element;
    a seventh rotational member consisting of the third ring gear and the fourth planet carrier and adapted to be directly connected to the output shaft so as to be operated as a final output element;
    an eighth rotation element consisting of the fourth ring gear and adapted to be selectively connected to the input shaft so as to be operated as a selective input element; and
    six friction members consisting of clutches interposed between a selected rotational member among the rotational members and the input shaft or between selected rotational members, and brakes interposed between a selected rotational member among the rotational members and a transmission housing.

3. The planetary gear train of claim 2, wherein the six friction members comprise:
    a first clutch interposed between the input shaft and the eighth rotational member;
    a second clutch interposed between the input shaft and the sixth rotational member;
    a third clutch interposed between the third rotational member and the fifth rotational member;
    a fourth clutch interposed between the third rotational member and the fourth rotational member;
    a first brake interposed between the sixth rotational member and the transmission housing; and
    a second brake interposed between the third rotational member and the transmission housing.

4. The planetary gear train of claim 3, wherein the multiple shift-speeds comprise:
    a first forward speed achieved by operating the third clutch and the first brake;
    a second forward speed achieved by operating the first clutch and the first brake;
    a third forward speed achieved by operating the first clutch and the third clutch;

a fourth forward speed achieved by operating the first clutch and the second brake;

a fifth forward speed achieved by operating the first clutch and the fourth clutch;

a sixth forward speed achieved by operating the first clutch and the second clutch;

a seventh forward speed achieved by operating the second clutch and the fourth clutch;

an eighth forward speed achieved by operating the second clutch and the second brake;

a ninth forward speed achieved by operating the second clutch and the third clutch; and a reverse speed achieved by operating the fourth clutch and the first brake.

5. A planetary gear train of an automatic transmission for vehicles achieving multiple shift-speeds, the planetary gear train comprising:

an input shaft adapted to receive engine torque;

an output shaft adapted to output a shifted torque;

a first planetary gear set being a single pinion planetary gear set having a first sun gear, a first planet carrier, and a first ring gear;

a second planetary gear set being a single pinion planetary gear set having a second sun gear, a second planet carrier, and a second ring gear;

a compound planetary gear set formed by combining a third planetary gear set having a third sun gear, a third planet carrier, and a third ring gear, and a fourth planetary gear set having a fourth sun gear, a fourth planet carrier, and a fourth ring gear;

a first rotational member consisting of the first sun gear and adapted to be directly connected to the input shaft so as to be always operated as an input element;

a second rotational member consisting of the first planet carrier and the second planet carrier and adapted to be directly connected to a transmission housing so as to be always operated as a fixed element;

a third rotational member consisting of the first ring gear and adapted to be always operated as an output element;

a fourth rotational member consisting of the second ring gear and adapted to be selectively connected to the third rotational member so as to be operated as a selective input element;

a fifth rotational member consisting of the second sun gear, the third sun gear, and the fourth sun gear, and adapted to be selectively connected to the third rotational member so as to be operated as a selective input element or to be selectively connected to the transmission housing so as to be operated as a selective fixed element;

a sixth rotational member consisting of the third planet carrier and adapted to be selectively connected to the transmission housing so as to be operated as a selective fixed element or to be selectively connected to the input shaft so as to be operated as a selective input element;

a seventh rotational member consisting of the third ring gear and the fourth planet carrier and adapted to be directly connected to the output shaft so as to be operated as a final output element;

an eighth rotation element consisting of the fourth ring gear and adapted to be selectively connected to the input shaft so as to be operated as a selective input element; and six friction members consisting of clutches interposed between a selected rotational member among the rotational members and the input shaft or between selected rotational members, and brakes interposed between a selected rotational member among the rotational members and a transmission housing.

6. The planetary gear train of claim 5, wherein the six friction members comprise:

a first clutch interposed between the input shaft and the eighth rotational member;

a second clutch interposed between the input shaft and the sixth rotational member;

a third clutch interposed between the third rotational member and the fifth rotational member;

a fourth clutch interposed between the third rotational member and the fourth rotational member;

a first brake interposed between the sixth rotational member and the transmission housing; and a second brake interposed between the third rotational member and the transmission housing.

7. The planetary gear train of claim 6, wherein the multiple shift-speeds comprise:

a first forward speed achieved by operating the third clutch and the first brake;

a second forward speed achieved by operating the first clutch and the first brake;

a third forward speed achieved by operating the first clutch and the third clutch;

a fourth forward speed achieved by operating the first clutch and the second brake;

a fifth forward speed achieved by operating the first clutch and the fourth clutch;

a sixth forward speed achieved by operating the first clutch and the second clutch;

a seventh forward speed achieved by operating the second clutch and the fourth clutch;

an eighth forward speed achieved by operating the second clutch and the second brake;

a ninth forward speed achieved by operating the second clutch and the third clutch; and a reverse speed achieved by operating the fourth clutch and the first brake.

* * * * *